United States Patent
Tan et al.

(10) Patent No.: US 10,976,593 B2
(45) Date of Patent: Apr. 13, 2021

(54) FILTER STRUCTURE, DISPLAY SUBSTRATE, DISPLAY PANEL AND DISPLAY DEVICE

(71) Applicant: BOE TECHNOLOGY GROUP CO., LTD., Beijing (CN)

(72) Inventors: Jifeng Tan, Beijing (CN); Xianqin Meng, Beijing (CN); Yafeng Yang, Beijing (CN); Xiandong Meng, Beijing (CN); Wei Wang, Beijing (CN); Jian Gao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 72 days.

(21) Appl. No.: 16/080,149

(22) PCT Filed: Feb. 12, 2018

(86) PCT No.: PCT/CN2018/076416
§ 371 (c)(1),
(2) Date: Aug. 27, 2018

(87) PCT Pub. No.: WO2019/024487
PCT Pub. Date: Feb. 7, 2019

(65) Prior Publication Data
US 2019/0265543 A1    Aug. 29, 2019

(30) Foreign Application Priority Data

Jul. 31, 2017  (CN) .......................... 201710642682.X

(51) Int. Cl.
*G02F 1/1335*  (2006.01)
*G02B 5/20*  (2006.01)
*G02B 5/26*  (2006.01)

(52) U.S. Cl.
CPC ....... *G02F 1/133514* (2013.01); *G02B 5/201* (2013.01); *G02B 5/203* (2013.01); *G02B 5/265* (2013.01)

(58) Field of Classification Search
None
See application file for complete search history.

(56) References Cited

U.S. PATENT DOCUMENTS

2013/0229598 A1* 9/2013 Kamada .................. G02B 5/23
349/69
2014/0043550 A1* 2/2014 Chen ................ G02F 1/133512
349/41

FOREIGN PATENT DOCUMENTS

CN    201556006 U    8/2010
CN    102364360 A    2/2012
(Continued)

OTHER PUBLICATIONS

Espacenet English machine translation of CN106990465A (Year: 2017).*

(Continued)

*Primary Examiner* — Edward J Glick
*Assistant Examiner* — David Y Chung
(74) *Attorney, Agent, or Firm* — Dilworth & Barrese, LLP.; Michael J. Musella, Esq.

(57) ABSTRACT

A filter structure, a display substrate, a display panel and a display device are provided. The filter structure includes a first refractive index match layer, a waveguide layer, a second refractive index match layer and a grating layer, that are stacked, the waveguide layer is located between the first refractive index match layer and the second refractive index match layer, the second refractive index match layer is located between the waveguide layer (112) and the grating layer, and refractive index of the first refractive index match (Continued)

layer and refractive index of the second refractive index match layer both are smaller than refractive index of the waveguide layer.

17 Claims, 8 Drawing Sheets

(56) References Cited

FOREIGN PATENT DOCUMENTS

| | | | | |
|---|---|---|---|---|
| CN | 102789021 A | | 11/2012 | |
| CN | 102798918 A | | 11/2012 | |
| CN | 103245996 A | * | 8/2013 | |
| CN | 103245996 A | | 8/2013 | |
| CN | 103424995 A | | 12/2013 | |
| CN | 203759379 U | | 8/2014 | |
| CN | 106292124 A | | 1/2017 | |
| CN | 106526738 A | | 3/2017 | |
| CN | 106990465 A | * | 7/2017 | ....... G02F 1/133514 |
| CN | 106990465 A | | 7/2017 | |
| CN | 107390418 A | | 11/2017 | |
| JP | 2008058344 A | | 3/2008 | |
| JP | 2010122590 A | | 6/2010 | |

OTHER PUBLICATIONS

Espacenet English machine translation of CN103245996A (Year: 2013).*
International Search Report and Written Opinion dated Apr. 27, 2018 from State Intellectual Property Office of the P.R. China.
First Chinese Office Action dated Oct. 8, 2019.

* cited by examiner

FILTER STRUCTURE, DISPLAY SUBSTRATE, DISPLAY PANEL AND DISPLAY DEVICE

The present application claims priority to Chinese patent application No. 201710642682.X, filed on Jul. 31, 2017, the entire disclosure of which is incorporated herein by reference as part of the present application.

TECHNICAL FIELD

Embodiments of the present disclosure relate to a filter structure, a display substrate, a display panel and a display device.

BACKGROUND

With development of global information society, demands for various display devices have been increased. Therefore, a great deal of effort has been devoted to research and development of various flat display devices such as a liquid crystal display (LCD) device, a plasma display panel (PDP), an electroluminescence display (ELD) device, and a vacuum fluorescent display (VFD) device. The liquid crystal display device is widely used in people's lives, work, and other fields, due to its advantages, such as low power consumption, low cost, no radiation, and easy operation. For example, the liquid crystal display device is used in related electronic products of homes, public places, office places, individuals and the like.

Currently, in a process of manufacturing the liquid crystal display device, a thin film transistor array substrate and a color filter substrate are generally separately manufactured, the two substrates are aligned, the liquid crystal are injected between the two substrates to form a display panel, and then the display panel is loaded into a housing to obtain the display device. With development of a display technology, a photonic crystal color filter technology is gradually applied to display devices; however, because a photonic crystal spectrum of the existing photonic crystal color filter comprises many miscellaneous peaks and a full width at half maximum is relatively wide, color gamut of the existing photonic crystal color filter is insufficient and color is not pure.

SUMMARY

Embodiments of the present disclosure provide a filter structure, and the filter structure comprises a first refractive index match layer, a waveguide layer, a second refractive index match layer, and a grating layer, that are stacked, the waveguide layer is located between the first refractive index match layer and the second refractive index match layer, the second refractive index match layer is located between the waveguide layer and the grating layer, and refractive index of the first refractive index match layer and refractive index of the second refractive index match layer both are smaller than refractive index of the waveguide layer.

For example, in the filter structure provided by the embodiments of the present disclosure, the refractive index of the first refractive index match layer and the refractive index of the second refractive index match layer are substantially same with each other.

For example, in the filter structure provided by the embodiments of the present disclosure, the refractive index of the first refractive index match layer ranges from 1.2 to 1.7.

For example, in the filter structure provided by the embodiments of the present disclosure, the refractive index of the second refractive index match layer ranges from 1.2 to 1.7.

For example, in the filter structure provided by the embodiments of the present disclosure, refractive index of the grating layer ranges from 1.33 to 1.8.

For example, in the filter structure provided by the embodiments of the present disclosure, the refractive index of the waveguide layer ranges from 1.8 to 2.0.

For example, in the filter structure provided by the embodiments of the present disclosure, a material of the waveguide layer is silicon nitride.

For example, in the filter structure provided by the embodiments of the present disclosure, a material of the second refractive index match layer is silicon oxide.

The embodiments of the present disclosure further provide a display substrate, and the display substrate comprises a base substrate and a filter structure described in any one of the above embodiments, and the filter structure is on the base substrate.

For example, in the display substrate provided by the embodiments of the present disclosure, the base substrate and the first refractive index match layer of the filter structure are integral with each other.

For example, the display substrate provided by the embodiments of the present disclosure further comprises a light absorption layer, and the light absorption layer is on a side of the base substrate facing away from the filter structure.

For example, in the display substrate provided by the embodiments of the present disclosure, the grating layer comprises a first grating for emitting red light, the first grating comprises a plurality of first grating units, each first grating unit has a width ranging from 380 to 500 nanometers, each first grating unit comprises a first grating step, and the first grating step has a width ranging from 200 to 300 nanometers.

For example, in the display substrate provided by the embodiments of the present disclosure, the grating layer comprises a second grating for emitting green light, the second grating comprises a plurality of second grating units, each second grating unit has a width ranging from 300 to 380 nanometers, each second grating unit comprises a second grating step, and the second grating step has a width ranging from 150 to 200 nanometers.

For example, in the display substrate provided by the embodiments of the present disclosure, the grating layer comprises a third grating for emitting blue light, the third grating comprises a plurality of third grating units, each third grating unit has a width ranging from 200 to 370 nanometers, each third grating unit comprises a third grating step, and the third grating step has a width ranging from 100 to 150 nanometers.

The embodiments of the present disclosure further provide a display panel, the display panel comprises the display substrate described in any one of the above embodiments, an opposite substrate disposed opposite to the display substrate, and a liquid crystal layer between the display substrate and the opposite substrate.

For example, the display panel provided by the embodiments of the present disclosure further comprises a light source and a side-type light guide plate. The light source and the side-type light guide plate are both on a side of the opposite substrate facing away from the display substrate, and the light source is on a light incident side of the side-type light guide plate.

The embodiments of the present disclosure further provide a display device, comprising any one of the above described display panels.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
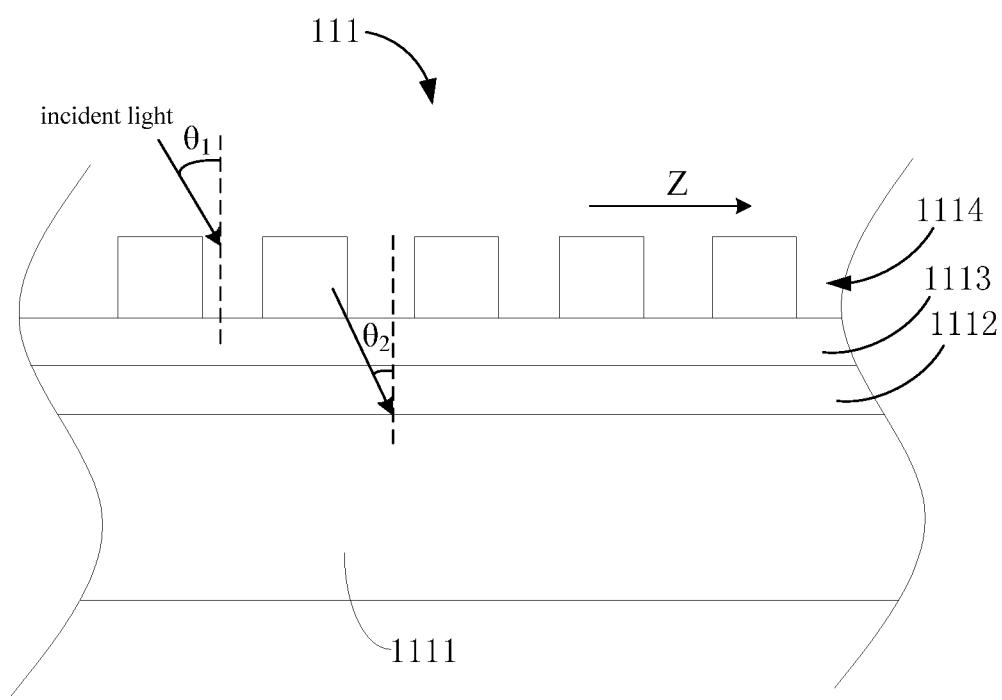
FIG. 1 is a partial cross-sectional view of a filter structure provided by embodiments of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Embodiments of the present disclosure provide a filter structure, a display substrate, a display panel and a display device. In the filter structure, a waveguide layer, a second refractive index match layer and a grating layer are sequentially stacked, so as to form a waveguide grating coupler; after incident light with a certain incident angle is incident on the waveguide grating coupler, light of different wavelengths are incident on a contact surface (such as, a lower surface of the waveguide layer) of the waveguide layer and a first refractive index match layer at different incident angles; and an incident angle of a target incident light (that is, light that needs to be filtered out) on the lower surface of the waveguide layer is greater than a critical angle of the lower surface of the waveguide layer, so that the target incident light is totally reflected at the contact surface of the waveguide layer and the first refractive index match layer, and is reflected to a contact surface (such as, an upper surface of the waveguide layer) of the waveguide layer and the second refractive index match layer. Due to a function of the waveguide grating coupler, a portion of the target incident light is emitted from the grating layer, and another portion of the target incident light continues to be transmitted in the waveguide layer and is emitted at different positions. On the lower surface of the waveguide layer, the incident light, whose incident angle does not satisfy a total reflection requirement, is a non-target incident light, and the non-target incident light is emitted from the lower surface of the waveguide layer and is absorbed by an absorption layer. Thus, only light of a specific wavelength (that is, the target incident light) propagates in the waveguide layer, and then is diffracted upward through the grating layer to form a target emitting light, so as to effectively reduce a full width at half maximum of the target emitting light, remove miscellaneous peaks, and improve color gamut of the target emitting light.

Referring to FIG. 1, FIG. 1 is a partial cross-sectional view of a filter structure provided by the embodiments of the present disclosure. As shown in FIG. 1, the embodiments of the present disclosure provide the filter structure 111, and the filter structure 111 comprises a first refractive index match layer 1111, a waveguide layer 1112, a second refractive index match layer 1113, and a grating layer 1114. The first refractive index match layer 1111, the waveguide layer 1112, the second refractive index match layer 1113, and the grating layer 1114 are sequentially stacked. The waveguide layer 1112 is located between the first refractive index match layer 1111 and the second refractive index match layer 1113, and the second refractive index match layer 1113 is located between the waveguide later 1112 and the grating layer 1114.

For example, refractive index of the first refractive index match layer 1111 and refractive index of the second refractive index match layer 1113 are smaller than refractive index of the waveguide layer 1112.

For example, the grating layer 1114, the second refractive index match layer 1113 and the waveguide layer 1112 constitute a waveguide grating coupler. For example, a target incident light is incident on a contact surface of the waveguide layer 1112 and the second refractive index match layer 1113; under a function of the waveguide grating coupler, a portion of the target incident light is emitted from the grating layer 1114.

For example, in the embodiments of the present disclosure, the refractive index of the first refractive index match layer 1111 ranges from 1.2 to 1.7, and the refractive index of the second refractive index match layer 1113 ranges from 1.2 to 1.7. For example, a thickness of the first refractive index match layer 1111 ranges from 100 micrometers to 500 micrometers. For example, the refractive index of the second refractive index match layer 1113 is 1.46.

For example, the refractive index of the first refractive index match layer 1111 and the refractive index of the second refractive index match layer 1113 is substantially the same, and both are smaller than the refractive index of the waveguide layer 1112. For example, the refractive index of the first refractive index match layer 1111 and the refractive index of the second refractive index match layer 1113 both are 1.46.

For example, materials of the first refractive index match layer 1111 and the second refractive index match layer 1113 are silicon dioxide (SiO2). For example, the first refractive index match layer 1111 is a glass substrate.

For example, refractive index of the grating layer 1114 ranges from 1.33 to 1.8. For example, the refractive index of the grating layer 1114 ranges from 1.55 to 1.73.

For example, the grating layer 1114 comprises a step portion (that is, a grating step described in the following embodiments) and a grating gap between step portions, and the refractive index of the grating layer 1114 is refractive index of the step portion.

For example, the refractive index of the waveguide layer 1112 ranges from 1.8 to 2.0, and a material of the waveguide layer 1112 is silicon nitride (SiNx).

For example, the grating layer 1114 is configured that light of different wavelengths are incident on a contact surface of the first refractive index match layer 1111 and the waveguide layer 1112 at different incident angles. The light of different wavelengths comprises a target incident light. The first refractive index match layer 1111, the waveguide layer 1112 and the second refractive index match layer 1113 are configured that: the target incident light entering into the waveguide layer 1112 is totally reflected on the contact surface of the first refractive index match layer 1111 and the waveguide layer 1112, and continues to be transmitted in the waveguide layer 1112; and on a contact surface of the waveguide layer 1112 and the second refractive index match layer 1113, at least a portion of the target incident light is emitted from the waveguide layer 1112 to the grating layer 1114. The grating layer 1114 is further configured to diffract the at least a portion of the target incident light to form a target emitting light.

For example, after the target incident light enters the waveguide layer 1112 through the second refractive index match layer 1113, the target incident light propagates in the waveguide layer 1112. The target incident light propagates to the contact surface of the first refractive index match layer 1111 and the waveguide layer 1112; because the target incident light is totally reflected at the contact surface of the first refractive index match layer 1111 and the waveguide layer 1112, the target incident light is confined to propagate in the waveguide layer 1112 and does not enter the first refractive index match layer 1111. Then, the target incident light propagates to the contact surface of the waveguide layer 1112 and the second refractive index match layer 1113; due to the function of the waveguide grating coupler, the at least a portion of the target incident light is diffracted upward through the grating layer 1114 to form the target emitting light.

For example, the contact surface of the first refractive index match layer 1111 and the waveguide layer 1112 is a lower surface of the waveguide layer 1112. Accordingly, the contact surface of the waveguide layer 1112 and the second refractive index match layer 1113 is an upper surface of the waveguide layer 1112.

For example, the light of different wavelengths further comprise a non-target incident light, and an incident angle of the non-target incident light at the contact surface of the first refractive index match layer 1111 and the waveguide layer 1112 does not satisfy a total reflection requirement, so that the non-target incident light is emitted from the contact surface of the first refractive index match layer 1111 and the waveguide layer 1112 and is absorbed by the absorption layer.

It should be noted that, the target incident light is determined by a structure of the grating layer 1114, that is, if the grating layer 1114 has different structures, light that is totally reflected at the contact surface of the first refractive index match layer 1111 and the waveguide layer 1112 has different wavelengths. According to the structure of the grating layer 1114, the filter structure provided by the embodiments of the present disclosure filters out light of different wavelengths. The target incident light represents light that is totally reflected at the contact surface of the first refractive index match layer 1111 and the waveguide layer 1112 and propagates in the waveguide layer 1112; the non-target incident light indicates light that is not totally reflected at the contact surface of the first refractive index match layer 1111 and the waveguide layer 1112, so that the non-target incident light does not propagate in the waveguide layer 1112.

Specifically, the target incident light or the target emitting light satisfies a phase matching relationship of $\beta_q=\beta_m-qK$, so that the target incident light excites m-order guided mode in the waveguide layer 1112, in other words, the m-order guided mode is coupled out in a given direction. In the above-mentioned phase matching relationship, q is an integer such as 0, ±1, ±2, etc.; $\beta_m$ is a propagation constant of the m-order guided mode, m is a positive integer, $\beta_m=k_0N_m$, $N_m$ is effective refractive index of the m-order guided mode, $k_0=2\pi/\lambda$, $\lambda$ is a wavelength of the target incident light; and $\beta_q$ is a propagation constant of the target incident light or the target emitting light propagating in a Z direction shown in FIG. 1, K is a grating vector, $K=2\pi/\Lambda$, $\Lambda$ is a grating period. The waveguide layer 1112 is relatively thin. For example, in a case where a thickness of the waveguide layer 1112 is less than 10 um, angles of the light that propagate in the waveguide layer 1112 are discrete, and propagation modes of light propagating along different angles are different order guided modes. The propagation mode of the target incident light propagating at a certain angle is the m-order guided mode, and the intensity of the target incident light increases in a case where the target incident light propagates in the certain angle direction.

For example, as shown in FIG. 1, an angle between a wave vector direction (that is, a direction of wave propagation) of the incident light and a vertical direction (that is, a normal line of an incident plane) is $\theta_1$, and then the phase matching relationship described above is further expressed as $k_0n_c \sin\theta_1=k_0N_m-q2\pi/\Lambda$, $n_c$ is the refractive index of a propagation medium where the incident light is located, that is, $n_c$ is the refractive index of a medium on a side of the grating layer 1114 away from the waveguide layer 1112.

For example, as shown in FIG. 1, the above-mentioned phase matching relationship is further expressed as: $k_0n_c \sin\theta_1=k_0n_e \sin\theta_2-q2\pi/\Lambda$, $\theta_2$ is an angle between the wave vector direction of light of different wavelengths that are incident onto the waveguide layer 1112 and a normal line of the lower surface of the waveguide layer 1112, and $n_e$ is equivalent refractive index of the second refractive index match layer 1113 and the waveguide layer 1112. That is to say, the incident light that is incident at an $\theta_1$ angle passes through the grating waveguide coupler to form light of different wavelengths, and incident angles of the light of different wavelengths on the lower surface of the waveguide layer 1112 are different. Light having the incident angle on the lower surface of the waveguide layer 1112 larger than a critical angle of the total reflection is the target incident light, and the target incident light is totally reflected on the lower surface of the waveguide layer 1112 and is reflected to the upper surface of the waveguide layer 1112. Due to the function of the waveguide grating coupler, a portion of the target incident light is emitted from the grating layer 1114, and another portion of the target incident light continues to be transmitted in the waveguide layer 1112 and is emitted at different positions. However, light having the incident angle on the lower surface of the waveguide layer 1112 smaller than the critical angle of the total reflection is emitted from the lower surface of the waveguide layer 1112 and is absorbed by the absorption layer.

For example, the refractive index of the waveguide layer 1112 is $n_2$, and the refractive index of the first refractive index match layer 1111 and the refractive index of the second refractive index match layer 1113 both are m; according to the law of refraction, critical angles of the total reflection at the upper surface and the lower surface (that is, the contact surface of the waveguide layer 1112 and the second refractive index match layer 1113, and the contact surface of the first refractive index match layer 1111 and the waveguide layer 1112) of the waveguide layer 1112 both are $\gamma=\arcsin(n_1/n_2)$. Therefore, so long as that the incident angle of the target incident light that is incident on the lower surface of the waveguide layer 1112 satisfies $\alpha \geq \gamma$, it is ensured that the target incident light is confined to propagate in the waveguide layer 1112.

That is to say, the incident light is diffracted through the grating layer 1114 into the waveguide layer 1112, and light of a wavelength satisfying the above described phase matching relationship is referred to as the target incident light. The target incident light is totally reflected at the lower surface of the waveguide layer 1112 and the target incident light is reflected to the upper surface of the waveguide layer 1112, at least a portion of the target incident light is diffracted upward through the grating layer 1114 to form the target emitting light. However, light having a wavelength that does not satisfy the above-described phase matching relationship is not totally reflected on the lower surface of the waveguide layer 1112, and is directly transmitted through the first refractive index match layer 1111. The wavelength is selected by designing, adjusting, and optimizing parameters such as a period and a duty cycle of the grating in the grating layer 1114, and refractive indexes of other layers (such as, the waveguide layer 1112, the first refractive index match layer 1111, and the second refractive index match layer 1113).

According to the embodiments of the disclosure, the filter structure 111 allows the target incident light to pass through. The wavelength of the light that passes through the filter structure 111 is selected by adjusting parameters such as a period, a duty cycle, a height, and refractive index of the grating in the grating layer and the like. Therefore, the filter structure 111 is applied to a product or a scene that needs to select or filter light; for example, the technology and the filter structure 111 according to the embodiments of the disclosure is applied to a filter film of a display screen, so as to filter out blue light that is harmful to human eyes, and allow other light to pass through to achieve a healthy display effect; for another example, the technology and the filter structure 111 according to the embodiments of the disclosure is used to manufacture an anti-laser-damage protection film, etc. On one hand, the filter structure 111 for example is applied to a field of laser cutting. In a flexible display panel, laser cutting is required because a substrate is relatively thin; however, the laser cutting often occurs an overcutting phenomenon, and a problem of abnormal driving is resulted if the overcutting phenomenon is occurred on an edge of the flexible display panel. The filter structure for example is disposed in a laser cutting region, and a function of the filter structure is to reflect the laser wavelength without affecting the transmission of light of other wavelengths, so as to achieve a technical effect of not affecting the display and preventing the laser from overcutting to damage the electrode. On the other hand, the filter structure 111 for example is applied to a laser experiment, and the filter structure 111 is attached to a pair of protective glasses to achieve the technical effect of preventing laser from damaging the human eyes, and the technical effect of transmitting light.

Figure 2:
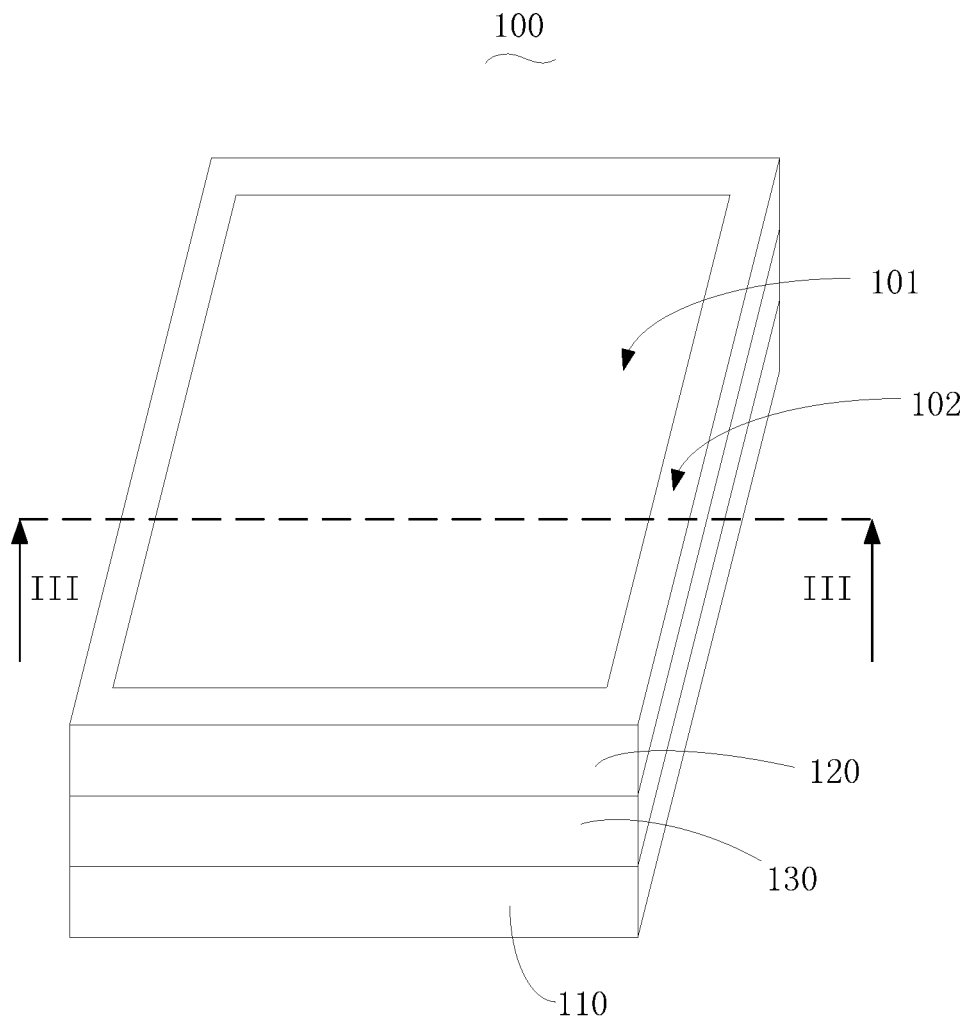
FIG. 2 is a stereogram of a display device provided by the embodiments of the present disclosure.
Figure 3:
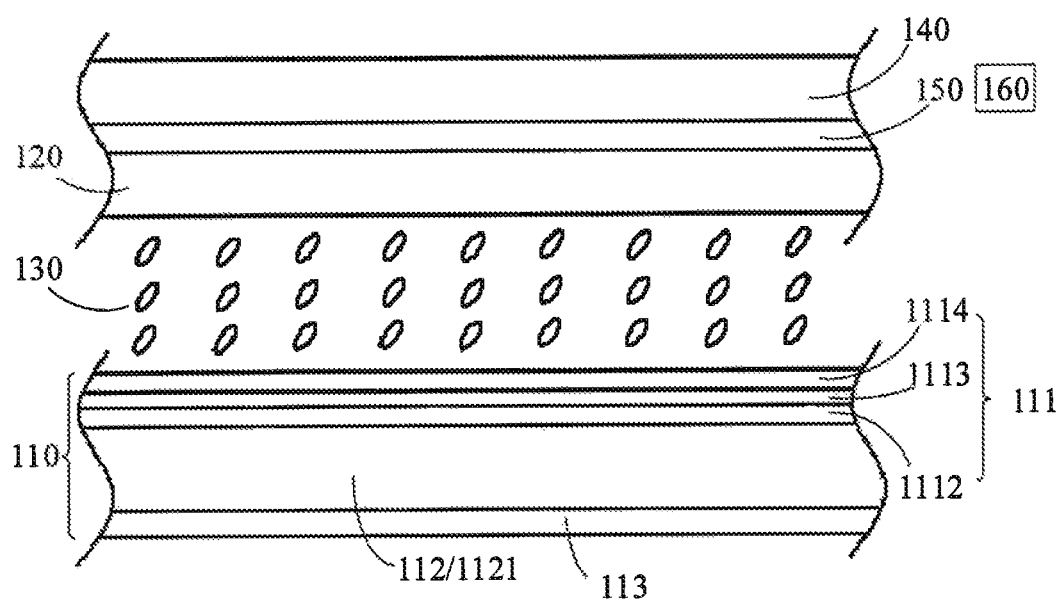
FIG. 3 is a partial cross-sectional view of a display panel of the display device taken along a direction of a line III-III in FIG. 2.

Referring to FIG. 2 and FIG. 3, FIG. 2 is a stereogram of a display device provided by the embodiments of the present disclosure; FIG. 3 is a partial cross-sectional view of a display panel of the display device taken along a direction of a line III-III in FIG. 2. As shown in FIG. 2, the embodiments of the present disclosure provide the display device 100, and the display device 100 comprises a display substrate 110, an opposite substrate 120 and a liquid crystal layer 130. The display substrate 110 is disposed opposite to the opposite substrate 120, and the liquid crystal layer 130 is interposed between the display substrate 110 and the opposite substrate 120. The display substrate 110, the opposite substrate 120, and the liquid crystal layer 130 all constitute a display panel of the display device 100. The display device 100 comprises a display area 101 and a peripheral area 102 surrounding the display area 101. The display area 101 is mainly used to implement a display output function of the display device 100, and the peripheral area 102 is mainly used for disposing traces and the like.

For example, as shown in FIG. 3, the display substrate 110 comprises the filter structure 111, an array substrate 112, and a light absorption layer 113. The filter structure 111, the array substrate 112, and the light absorption layer 113 are stacked, the array substrate 112 is located between the filter structure 111 and the light absorption layer 113, the filter structure 111 is on the array substrate 112 and is located between the array substrate 112 and the liquid crystal layer 130, and the light absorption layer 113 is located on a side of the array substrate 112 facing away from the filter structure 111.

For example, the filter structure 111 comprises the first refractive index match layer 1111 (shown in FIG. 1), the waveguide layer 1112, the second refractive index match layer 1113, and the grating layer 1114, and the first refractive index match layer 1111, the waveguide layer 1112, the second refractive index match layer 1113, and the grating layer 1114 are sequentially stacked. The first refractive index match layer 1111 is located between the array substrate 112 and the waveguide layer 1112, the waveguide later 1112 is located between the first refractive index match layer 1111 and the second refractive index match layer 1113, and the second refractive index match layer 1113 is located between the waveguide later 1112 and the grating layer 1114.

For example, the light absorption layer 113 is configured to absorb light emitted from the first refractive index match layer 1111 of the filter structure 111.

For example, the array substrate 112 further comprises a base substrate 1121 and a thin film transistor array (not shown) on the base substrate 1121, and the filter structure 111 is located on the base substrate 1121. For example, the base substrate 1121 of the array substrate 112 in the display substrate 110 and the first refractive index match layer 1111 of the filter structure 111 is integral with each other, that is, the base substrate 1121 of the array substrate 112 is further used as the first refractive index match layer 1111 of the filter structure 111.

For example, the refractive index of the first refractive index match layer 1111 and the refractive index of the second refractive index match layer 1113 are smaller than the refractive index of the waveguide layer 1112.

For example, the refractive index of the first refractive index match layer 1111 ranges from 1.2 to 1.7. The thickness of the first refractive index match layer 1111 ranges from 100 micrometers to 500 micrometers. The refractive index of the second refractive index match layer 1113 ranges from 1.2 to 1.7.

For example, the refractive index of the first refractive index match layer 1111 and the refractive index of the second refractive index match layer 1113 are substantially the same, and both are smaller than the refractive index of the waveguide layer 1112. For example, the refractive index of the first refractive index match layer 1111 and the refractive index of the second refractive index match layer 1113 both are 1.46.

For example, the materials of the first refractive index match layer 1111 and the second refractive index match layer 1113 are silicon dioxide (SiO2). For example, the first refractive index match layer 1111 is a glass substrate.

For example, the refractive index of the grating layer 1114 ranges from 1.33 to 1.8. For example, the refractive index of the grating layer 1114 ranges from 1.55 to 1.73.

For example, the refractive index of the waveguide layer 1112 ranges from 1.8 to 2.0, and the material of the waveguide layer 1112 is silicon nitride (SiNx).

For example, the thickness of the waveguide layer 1112 is less than 1 micrometer. Therefore, a quantity of guided modes that the target incident light excites in the waveguide layer 1112 is relatively small, so that the miscellaneous light is reduced, the color gamut of the light is purer and the color saturation is higher.

For example, as shown in FIG. 3, the display panel of the display device 100 further comprises a light source 160, a side-type light guide plate 140, and a polarizer 150. The light source 160, the side-type light guide plate 140, and the polarizer 150 are located on the opposite substrate 120, the light source 160 and the side-type light guide plate 140 both are located on a side of the opposite substrate 120 facing away from the display substrate 110, and the light source 160 is located on a side of a light incident surface of the side-type light guide plate 140, the light incident surface of the side-type light guide plate 140 is a lateral surface adjacent to and crossing with a light emitting surface of the side-type light guide plate 140, and the polarizer 150 is located between the side-type light guide plate 140 and the opposite substrate 120.

For example, light emitted by the light source 160 passes through the side-type light guide plate 140, the polarizer 150 and the liquid crystal 130, and is emitted to the filter structure 111, the incident light enters the grating layer 1114, and the grating layer 1114 is configured that the light of different wavelengths incident on the contact surface of the first refractive index match layer 1111 and the waveguide layer 1112 have different incident angles. The light of different wavelengths comprises the target incident light. The target incident light represents light that is totally reflected at the contact surface of the first refractive index match layer 1111 and the waveguide layer 1112 and propagates in the waveguide layer 1112.

For example, after the target incident light enters the waveguide layer 1112 through the second refractive index match layer 1113, the target incident light is transmitted in the waveguide layer 1112. The target incident light propagates to the contact surface of the first refractive index match layer 1111 and the waveguide layer 1112; because the target incident light is totally reflected at the contact surface of the first refractive index match layer 1111 and the waveguide layer 1112, the target incident light is confined to propagate in the waveguide layer 1112. The, the target incident light is transmitted to the contact surface of the waveguide layer 1112 and the second refractive index match layer 1113; due to the function of the waveguide grating coupler, the grating layer 1114 is further configured to diffract at least a portion of the target incident light to form the target emitting light; and after the at least a portion of the target emitting light passes through the liquid crystal layer 130, the polarizer 150 and the side-type light guide plate 140, the at least a portion of the target emitting light is emitted from a back surface of the side-type light guide plate 140 opposite to the light emitting surface of the side-type light guide plate 140.

Figure 4:
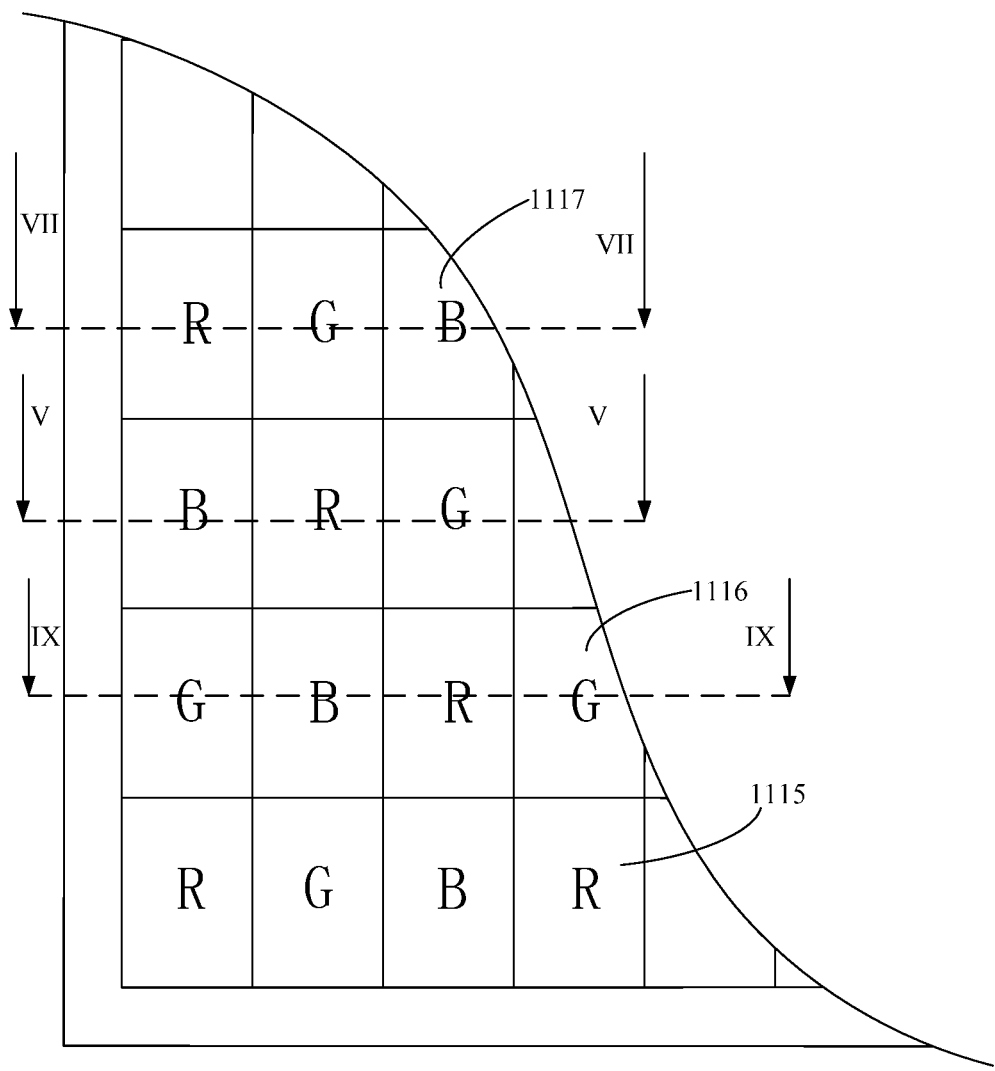
FIG. 4 is a plane view of a display substrate of the display panel shown in FIG. 3.
Figure 5:
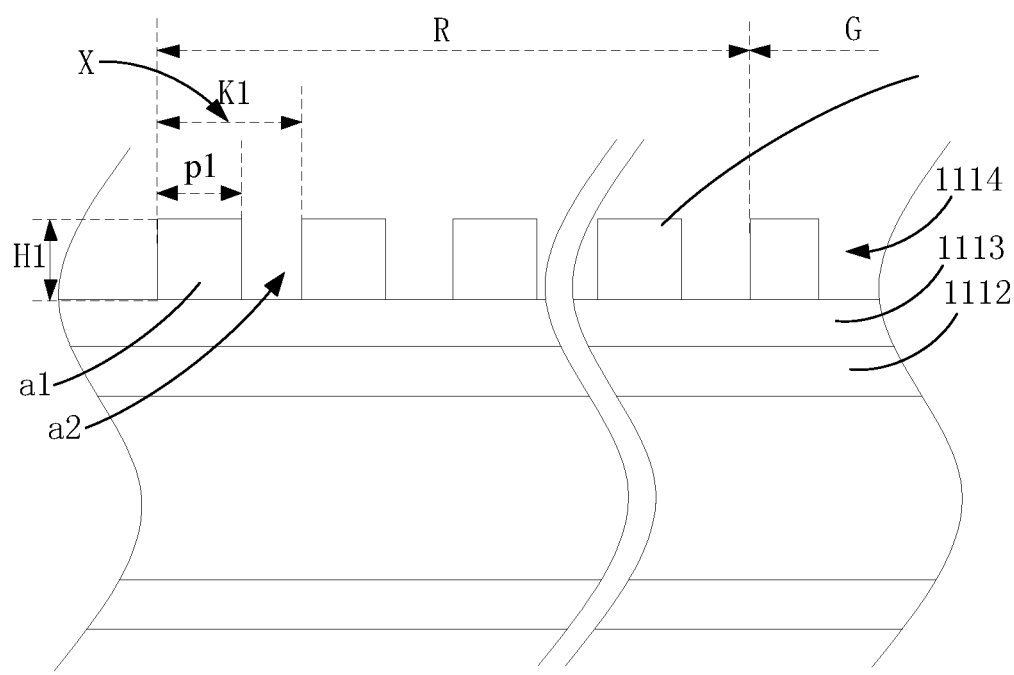
FIG. 5 is a partial cross-sectional view of the display substrate taken along a direction of a line V-V in FIG. 4.
Figure 6:
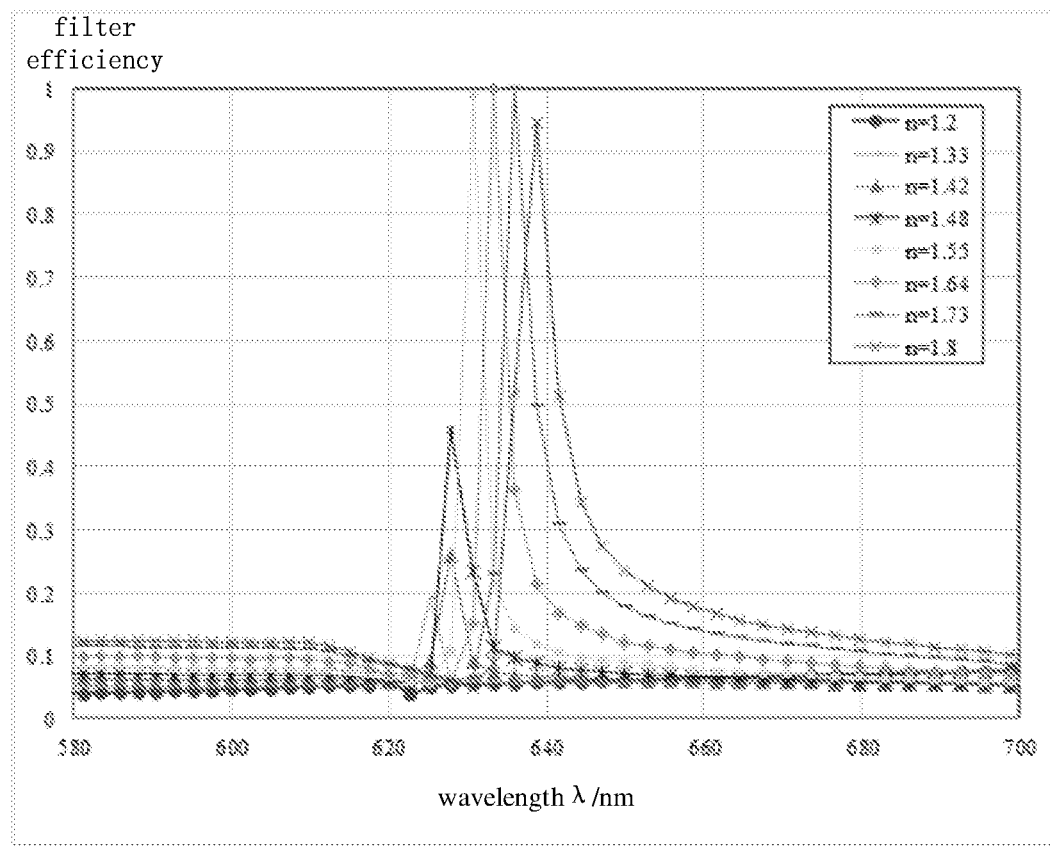
FIG. 6 is a schematic diagram of filtering results of the filter structure corresponding to a first grating shown in FIG. 5 in a case where the first grating shown in FIG. 5 is at different refractive indices.
Figure 7:
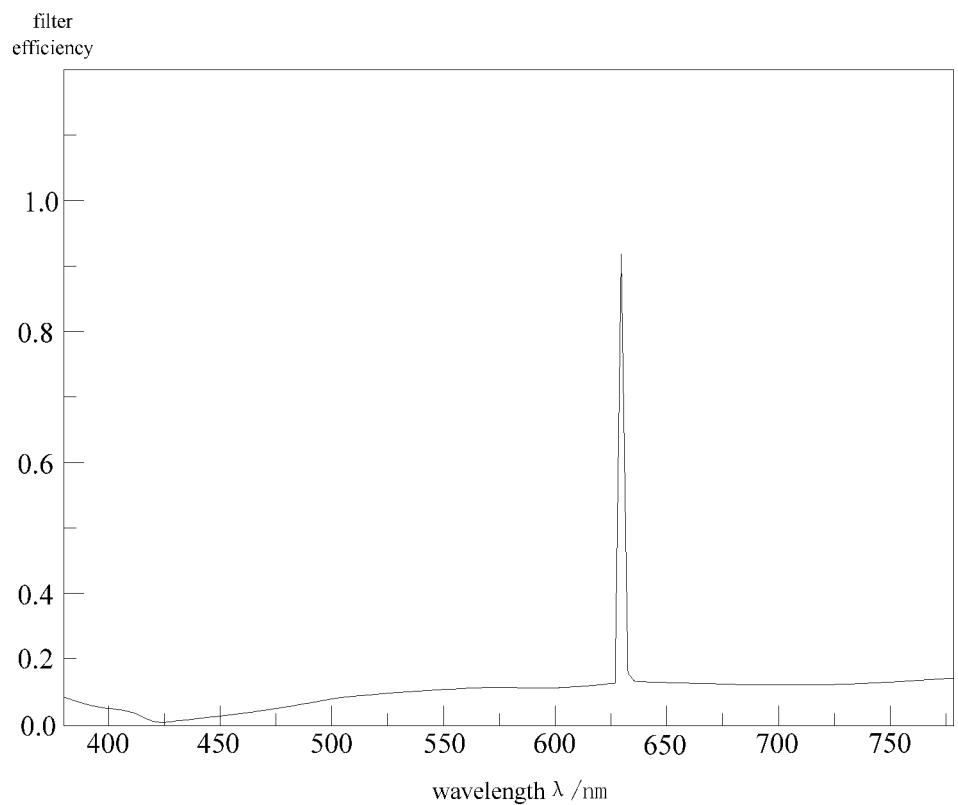
FIG. 7 is a schematic diagram of filtering results of the filter structure corresponding to the first grating shown in FIG. 5.
Figure 8:
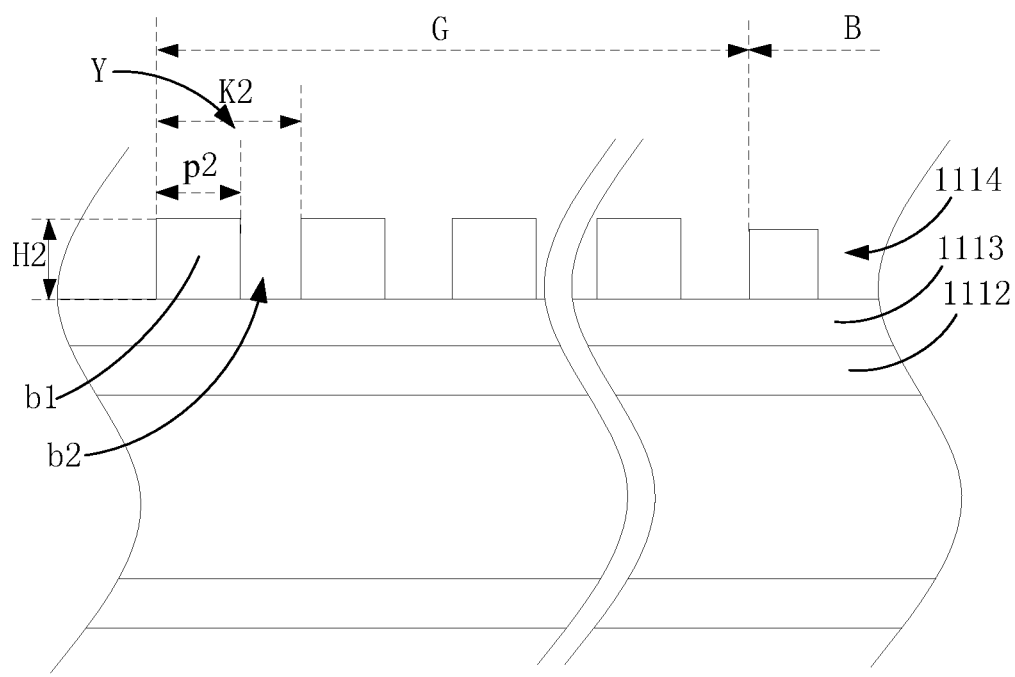
FIG. 8 is a partial cross-sectional view of the display substrate taken along a direction of a line VII-VII in FIG. 4.
Figure 9:
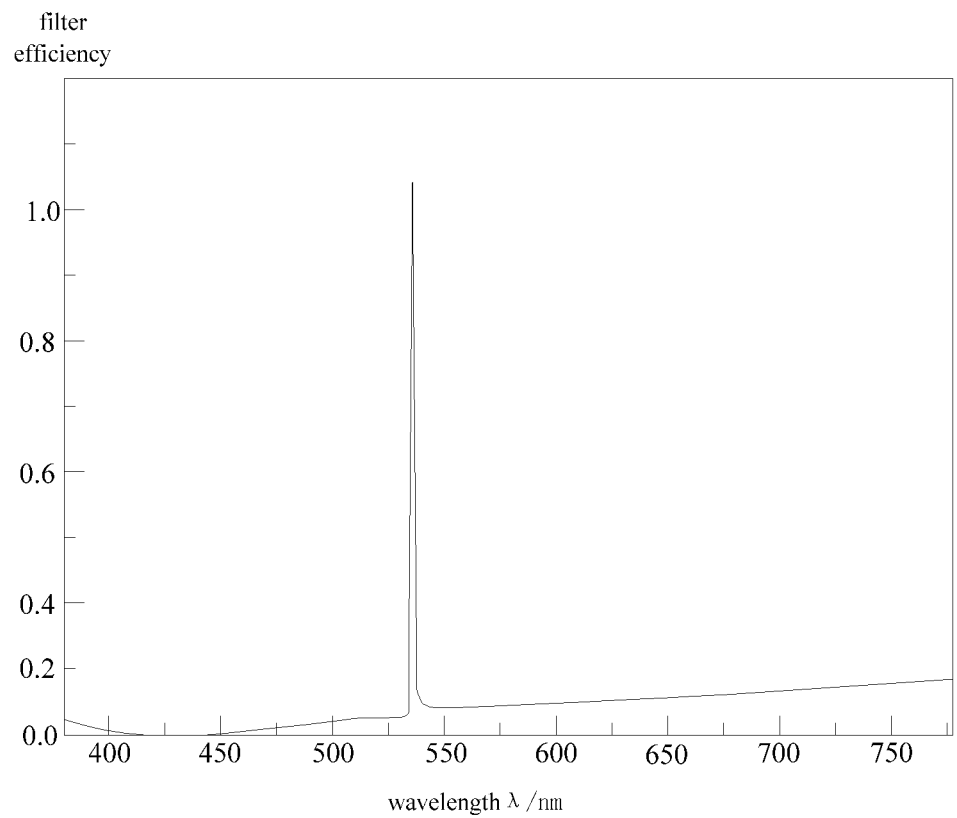
FIG. 9 is a schematic diagram of filtering results of the filter structure corresponding to a second grating shown in FIG. 8.
Figure 10:
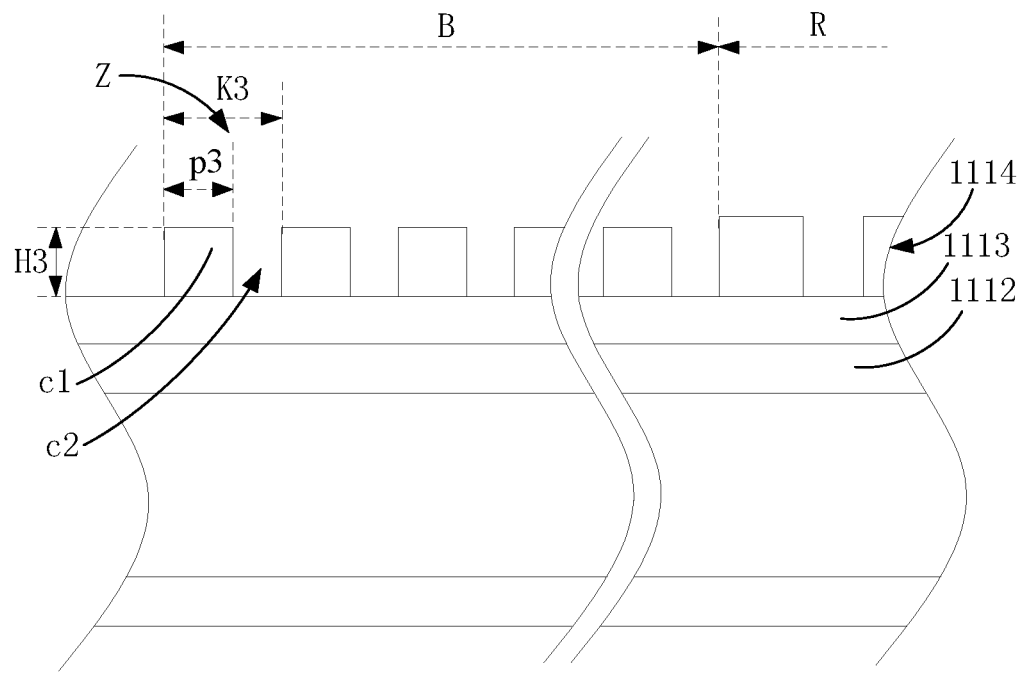
FIG. 10 is a partial cross-sectional view of the display substrate taken along a direction of a line IX-IX in FIG. 4.
Figure 11:
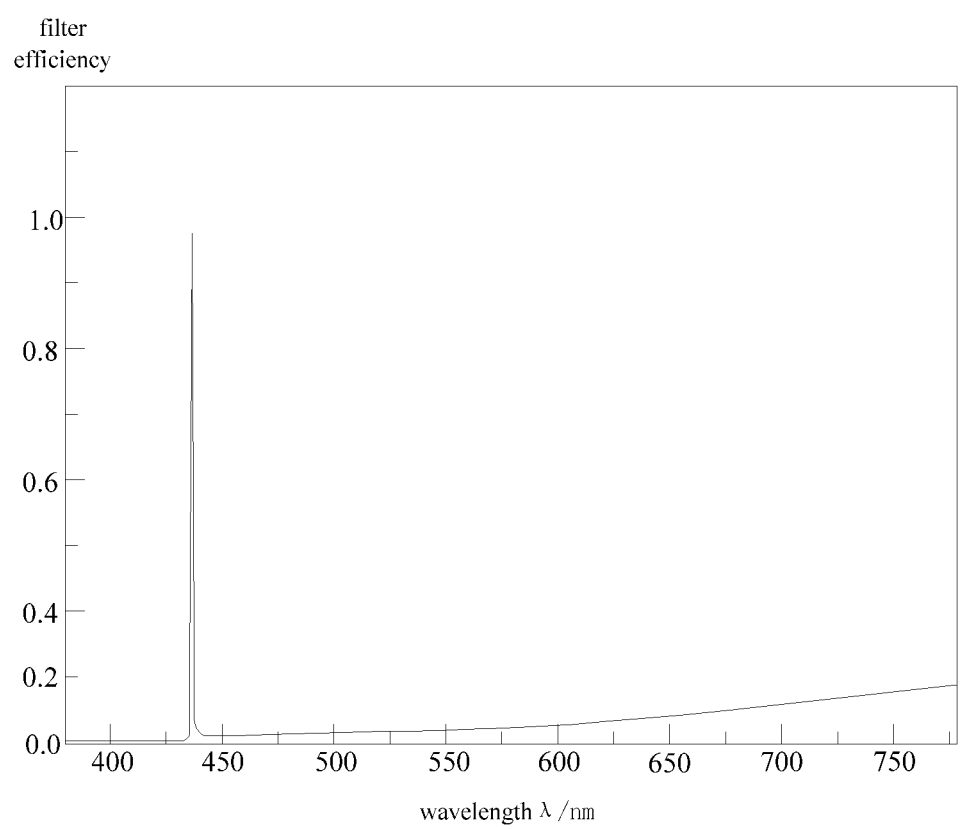
FIG. 11 is a schematic diagram of filtering results of the filter structure corresponding to a third grating shown in FIG. 10.

Referring to FIG. 4, FIG. 5, FIG. 6, FIG. 7, FIG. 8, FIG. 9, and FIG. 10, FIG. 4 is a plane view of the display substrate shown in FIG. 3, FIG. 5 is a partial cross-sectional view of the display substrate taken along a direction of a line V-V in FIG. 4; FIG. 6 is a schematic diagram of filtering results of the filter structure corresponding to a first grating shown in FIG. 5 in a case where the first grating shown in FIG. 5 is at different refractive indices; FIG. 7 is a schematic diagram of filtering results of the filter structure corresponding to the first grating shown in FIG. 5; FIG. 8 is a partial cross-sectional view of the display substrate taken along a direction of a line VII-VII in FIG. 4; FIG. 9 is a schematic diagram of filtering results of the filter structure corresponding to a second grating shown in FIG. 8; FIG. 10 is a partial cross-sectional view of the display substrate taken along a direction of a line IX-IX in FIG. 4; and FIG. 11 is a schematic diagram of filtering results of the filter structure corresponding to a third grating shown in FIG. 10.

For example, as shown in FIG. 4, the grating layer 1114 in the filter structure 111 comprises a first grating 1115, a second grating 1116, and a third grating 1117. The first grating 1115, the second grating 1116, and the third grating 1117 are respectively combined with the array substrate 112 to respectively form a red pixel unit, a green pixel unit, and a blue pixel unit of the display device 100, so that the first grating 1115, the second grating 1116, and the third grating 1117 are used as a color filter structure of a color filter film of the display device 100.

For example, the first grating 1115 is a red grating used for emitting red light, the second grating 1116 is a green grating used for emitting green light, and the third grating 1117 is a blue grating used for emitting blue light.

For example, the first grating 1115, the second grating 1116, and the third grating 1117 are transmissive-type gratings, or reflective-type gratings.

For example, the filter structure comprises the first grating, the second grating, and the third grating, which is taken as an example to describe the present disclosure, but the present disclosure is not limited thereto. For example, in addition to the first grating, the second grating, and the third grating, the filter structure further comprises a white grating, a yellow grating, or a grating of other colors. The gratings included in the filter structure are designed according to actual needs, and the present disclosure is not limited thereto.

For example, as shown in FIG. 5, the first grating 1115 comprises a plurality of first grating units X, each first grating unit X has a width K1 ranging from 380 to 500 nm, and each first grating unit X has a height H1 ranging from 100 to 200 nm. For example, the width K1 of the first grating unit X is 416 nm, and the height H1 of the first grating unit X is 110 nm.

For example, each first grating unit X comprises a first grating step a1 and a first slit a2 so that the first grating step a1 and the first slit a2 are disposed alternately in the first grating 1115. The first grating step a1 for example is formed by a transparent material or a metal material. The first grating step a1 for example is transparent. The first slit a2 for example is configured to diffract the incident light. The first grating step a1 has a width p1 ranging from 200 to 300 nm. For example, the width p1 of the first grating step a1 is 267 nm.

For example, as shown in FIG. 6, the width K1 of the first grating unit X, the height H1 of the first grating unit X, and the width p1 of the first grating step a1 in the first grating unit X all are constant values, and the refractive index of the first grating 1115, that is, the refractive index of the first grating step a1, is adjusted; thus, a schematic diagram of filtering results shown in FIG. 6 is obtained, that is, FIG. 6 is a schematic diagram of red light that is emitted after the incident light passes through a first filter portion of the filter structure 111 where the first grating 1115 is located in a case where the grating (that is, the first grating 1115) has different refractive indices. It can be seen from FIG. 6, in a case that other parameters are determined, the selectivity of the wavelength of the incident light is achieved by adjusting the refractive index of the first grating 1115. In the embodiments of the present disclosure, in a case that the refractive index of the grating ranges from 1.33 to 1.8, the selectivity of the wavelength is achieved. The refractive index of the grating has an influence on the selectivity of the wavelength. For example, in a case that the refractive index of the grating ranges from 1.55 to 1.78, the diffraction efficiency of the grating is optimal. FIG. 6 merely shows the schematic diagram of the red light that is emitted after the incident light passes through the first filter portion of the filter structure 111 corresponding to the first grating 1115 in the case that the grating has different refractive indices. However, for green light and blue light, situations are similar to that of the red light; in a case that the gratings (that is, the second grating and the third grating) have different refractive indices, the green light and the blue light have different spectra.

For example, light of a specific wavelength is incident on the first grating unit and the emitting amount of the light of the specific wavelength is measured. As shown in FIG. 7, an abscissa is the wavelength of the incident light, an ordinate is the filtering efficiency, and the filtering efficiency refers to a ratio of the emitting amount of the light of the specific wavelength to the incident amount of the light of the specific wavelength. Experimental data shows that in a case where the width K1 of the first grating unit X is 416 nm, the height H1 of the first grating unit X is 110 nm, the thickness of the first grating unit X is 110 nm, and the width p1 of the first grating step a1 is 267 nm, the red light, that is emitted after the light passes through the first filter portion of the filter structure 111 corresponding to the first grating 1115, has a relatively good effect, the color gamut is relatively high, and the full width at half maximum is relatively small. At this situation, a wavelength of a center region of the emitted red light is about 640 nm, and the full width at half maximum is less than 10 nm, and the filter efficiency is 70%.

For example, as shown in FIG. 8, the second grating 1116 comprises a plurality of second grating units Y, each second grating unit Y has a width K2 ranging from 300 to 380 nm, and each second grating unit Y has a height H2 ranging from 80 to 200 nm. For example, the width K2 of the second grating unit Y is 350 nm, and the height H2 of the second grating unit Y is 110 nm.

For example, each second grating unit Y comprises a second grating step b1 and a second slit b2 so that the second grating step b1 and the second slit b2 are disposed alternately in the second grating 1116. The second grating step b1 for example is formed by a transparent material or a metal material. For example, the second grating step b1 is transparent. The second slit b2 for example is configured to diffract the incident light. The second grating step b1 has a width p2 ranging from 150 to 200 nm. For example, the width p2 of the second grating step b1 is 176 nm.

As shown in FIG. 9, experimental data shows that in a case where the width K2 of the second grating unit Y is 350 nm, the height H2 of the second grating unit Y is 110 nm, and the width p2 of the second grating step b1 is 176 nm, the green light, that is emitted after the light passes through a second filter portion of the filter structure 111 corresponding to the second grating 1116, has a relatively good effect, the color gamut is relatively high, and the full width at half maximum is relatively small. At this situation, a wavelength of a center region of the emitted green light is about 540 nm, and the full width at half maximum is less than 10 nm, and the filter efficiency is 90%.

For example, as shown in FIG. 10, the third grating 1117 comprises a plurality of third grating units Z, each third grating unit Z has a width K3 ranging from 200 to 370 nm, and each third grating unit Z has a height H3 ranging from 50 to 120 nm. For example, the width K3 of the third grating unit Z is 271 nm, and the height H3 of the third grating unit Z is 76 nm.

For example, each third grating unit Z comprises a third grating step c1 and a third slit c2 so that the third grating step c1 and the third slit c2 are disposed alternately in the third grating 1117. The third grating step c1 for example is formed by a transparent material or a metal material. For example, the third grating step c1 is transparent. The third slit c2 for example is configured to diffract the incident light. The third grating step c1 has a width p3 ranging from 100 to 150 nm. For example, the width p3 of the third grating step c1 is 139 nm.

As shown in FIG. 11, experimental data shows that in a case where the width K3 of the third grating unit Z is 271 nm, the height H3 of the third grating unit Z is 76 nm, and the width p3 of the third grating step c1 is 139 nm, the blue light, that is emitted after passing through a third filter portion of the filter structure 111 corresponding to the third grating 1117, has a relatively good effect, the color gamut is relatively high, and the full width at half maximum is relatively small. At this situation, a wavelength of a center region of the emitted blue light is about 440 nm, and the full width at half maximum is less than 10 nm, and the filter efficiency is 85%.

The embodiments of the present disclosure provide the filter structure, the display substrate, the display panel, and the display device. In the filter structure, the waveguide layer, the second refractive index match layer and the grating layer are sequentially stacked, so as to form the waveguide grating coupler; after incident light with a certain incident angle is incident on the waveguide grating coupler, light of different wavelengths are incident on the contact surface (such as, the lower surface of the waveguide layer) of the waveguide layer and the first refractive index match layer at different incident angles; and the incident angle of the target incident light (that is, the light that needs to be filtered out) on the lower surface of the waveguide layer is greater than the critical angle of the lower surface of the waveguide layer, so that the target incident light is totally reflected at the contact surface of the waveguide layer and the first refractive index match layer, and is reflected to the contact surface (such as, the upper surface of the waveguide layer) of the waveguide layer and the second refractive index match layer. Due to the function of the waveguide grating coupler, a portion of the target incident light is emitted from the grating layer, and another portion of the target incident light continues to be transmitted in the waveguide layer and is emitted at different positions. On the lower surface of the waveguide layer, the incident light, whose incident angle does not satisfy the total reflection requirement, is the non-target incident light, and the non-target incident light is emitted from the lower surface of the waveguide layer and is absorbed by the absorption layer. Thus, only light of a specific wavelength (that is, the target incident light) propagates in the waveguide layer, and then is diffracted upward through the grating layer to form the target emitting light, so as to effectively reduce the full width at half maximum of the target emitting light, remove miscellaneous peaks, and improve color gamut of the target emitting light.

What are described above is related to the specific embodiments of the present disclosure only and not limitative to the scope of the disclosure. Within the disclosed technical scope of the disclosure, the modification and replacement, which any skilled who is familiar with the technical field may easily conceive, should be covered within the scope of the protection of the disclosure. Therefore, the scopes of the disclosure are defined by the accompanying claims.

What is claimed is:

1. A filter structure, comprising: an absorption layer, a first refractive index match layer, a waveguide layer, a second refractive index match layer, and a grating layer, that are stacked,
   wherein the waveguide layer is located between the first refractive index match layer and the second refractive index match layer, the second refractive index match layer is located between the waveguide layer and the grating layer, the absorption layer is provided on a side of the first refractive index match layer facing away from the waveguide layer, and refractive index of the first refractive index match layer and refractive index of the second refractive index match layer both are smaller than refractive index of the waveguide layer,
   wherein in a stack direction of the filter structure, the absorption layer and the grating layer are respectively at two opposite sides of the filter structure;
   the grating layer is configured that light of different wavelengths are incident on a contact surface of the first refractive index match layer and the waveguide layer at different incident angles, and the light of different wavelengths comprises a target incident light;
   the first refractive index match layer, the waveguide layer and the second refractive index match layer are configured that: the target incident light entering into the waveguide layer is totally reflected on the contact surface of the first refractive index match layer and the waveguide layer, and continues to be transmitted in the waveguide layer; and on a contact surface of the waveguide layer and the second refractive index match layer, at least a portion of the target incident light is emitted from the waveguide layer to the grating layer;
   the grating layer is further configured to diffract the at least a portion of the target incident light to form a target emitting light;
   the light of different wavelengths further comprise a non-target incident light, the first refractive index match layer and the waveguide layer are further configured that: an incident angle of the non-target incident light at the contact surface of the first refractive index match layer and the waveguide layer does not satisfy a total reflection requirement, so that the non-target incident light is emitted from the contact surface of the first refractive index match layer and the waveguide layer, and the non-target incident light is absorbed by the absorption layer.

2. The filter structure according to claim 1, wherein the refractive index of the first refractive index match layer and the refractive index of the second refractive index match layer are substantially same with each other.

3. The filter structure according to claim 1, wherein the refractive index of the first refractive index match layer ranges from 1.2 to 1.7.

4. The filter structure according to claim 1, wherein the refractive index of the second refractive index match layer ranges from 1.2 to 1.7.

5. The filter structure according to claim 1, wherein refractive index of the grating layer ranges from 1.33 to 1.8.

6. The filter structure according to claim 1, wherein the refractive index of the waveguide layer ranges from 1.8 to 2.0.

7. The filter structure according to claim 1, wherein a material of the waveguide layer is silicon nitride.

8. The filter structure according to claim 1, wherein a material of the second refractive index match layer is silicon oxide.

9. A display substrate, comprising a base substrate and the filter structure according to claim 1,
   wherein the filter structure is on the base substrate.

10. The display substrate according to claim 9, wherein the base substrate and the first refractive index match layer of the filter structure are integral with each other.

11. The display substrate according to claim 9,
    wherein the light absorption layer is on a side of the base substrate facing away from the waveguide layer of the filter structure.

12. The display substrate according to claim 9, wherein
    the grating layer comprises a first grating for emitting red light, the first grating comprises a plurality of first grating units, each first grating unit has a width ranging from 380 to 500 nanometers,
    each first grating unit comprises a first grating step, and the first grating step has a width ranging from 200 to 300 nanometers.

13. The display substrate according to claim 9, wherein
    the grating layer comprises a second grating for emitting green light, the second grating comprises a plurality of second grating units, each second grating unit has a width ranging from 300 to 380 nanometers,
    each second grating unit comprises a second grating step, and the second grating step has a width ranging from 150 to 200 nanometers.

14. The display substrate according to claim 9, wherein
the grating layer comprises a third grating for emitting
blue light, the third grating comprises a plurality of
third grating units, each third grating unit has a width
ranging from 200 to 370 nanometers, each third grating unit comprises a third grating step, and
the third grating step has a width ranging from 100 to
150 nanometers.

15. A display panel, comprising: the display substrate
according to claim 9, an opposite substrate disposed opposite to the display substrate, and a liquid crystal layer
between the display substrate and the opposite substrate.

16. The display panel according to claim 15, further
comprising a light source and a side-type light guide plate, wherein the light source and the side-type light guide
plate are both on a side of the opposite substrate facing
away from the display substrate, and the light source is
on a light incident side of the side-type light guide
plate.

17. A display device, comprising: the display panel
according to claim 15.

\* \* \* \* \*